United States Patent [19]
Davis

[11] Patent Number: 6,041,541
[45] Date of Patent: Mar. 28, 2000

[54] FISHING LINE THREADER

[76] Inventor: Daniel Davis, 8745 121st St., Hugo, Minn. 55038

[21] Appl. No.: 09/220,548

[22] Filed: Dec. 23, 1998

[51] Int. Cl.[7] ............................ A01K 91/04; A01K 83/00
[52] U.S. Cl. ............................... 43/44.83; 43/43.16; 43/4; 223/99; 112/225; 7/170
[58] Field of Search .......................... 43/4, 42.49, 44.83, 43/43.16; 112/225; 7/170; 223/99

[56] References Cited

U.S. PATENT DOCUMENTS

| | | | |
|---|---|---|---|
| 1,322,815 | 11/1919 | Patterson . | |
| 1,601,018 | 9/1926 | Haynes . | |
| 1,714,421 | 5/1929 | Goldworthy . | |
| 2,138,309 | 11/1938 | Stevenson | 40/2 |
| 2,682,126 | 6/1954 | Shepherd | 223/99 |
| 3,066,372 | 12/1962 | Parker | 24/128 |
| 3,357,086 | 12/1967 | Hood | 223/99 |
| 3,878,637 | 4/1975 | Flower | 43/44.83 |
| 4,667,433 | 5/1987 | Thompson, Jr. | 43/25.2 |
| 5,638,633 | 6/1997 | Hoffman, Jr. | 43/44.83 |
| 5,806,233 | 9/1998 | Murphey | 43/42.04 |
| 5,806,235 | 9/1998 | Martin | 43/57.1 |

FOREIGN PATENT DOCUMENTS 454144  of 1927  Switzerland ............................ 223/99

*Primary Examiner*—Jack W. Lavinder
*Attorney, Agent, or Firm*—Jacobson & Johnson

[57] ABSTRACT

A fishhook threading mechanism that can be temporarily attached to a fishhook eye to allow a user to easily and quickly thread a fishhook and then removed from the line by either crushing the threader or guiding the line through a radial slot located in the threader so that a user may have a fishing line free of the fishhook threading mechanism.

14 Claims, 3 Drawing Sheets

FISHING LINE THREADER

FIELD OF THE INVENTION

This invention relates generally to threaders, and more specifically to a fishhook threader that can be temporarily attached to a fishhook to allow a user to easily insert an end of a fishing line through a convergent surface and aperture located in the threader and to thereby guide the fishing line through the eye of the fishhook.

BACKGROUND OF THE INVENTION

Threading a fishhook has always been an arduous task. Monofiliment line by its very nature is difficult to see, and the same low drag coefficient that allows the line to cut through the water with case also makes it slippery and difficult to grasp. Fishhooks generally have eyes that are in proportion with the rest of the hook, and traditionally, this has meant a very small opening. It follows then, that the process of threading a fishhook can be very difficult even in ideal conditions. Couple the task with adverse conditions such as darkness, rain, high winds or extreme cold, and a difficult task can suddenly become a arduous task which takes valuable time away from a fisherperson, time that could be better spent fishing.

Prior inventions have sought to overcome this difficulty in a number of ways. U.S. Pat. No. 3,878,637 for example, utilizes a "C" hook end that allows a fisherperson to slip the hook on to a pre-knotted line. While effective in the initial attachment of the line to the hook, the pressure exerted on the hook, and therefore the knot, by a fish strike, underwater debris, or simple drag could cause the knot to come undone and the hook to be lost. If a fisherperson is using jerking motions to pull the hook through the water, each time that the line goes slack the line is in danger of sliding off of the hook in the opposite manner in which it was attached. Finally, the use of such a hook requires a fisherperson to obtain special equipment (namely, the "C" hooks).

Similarly, U.S. Pat. No. 5,638,633 attempts to solve this dilemma by introducing a threader that is inserted into the eye of the hook to funnel the monofilament line through the hook. While solving the problem of threading the hook, the invention creates another problem by leaving the threader attached to the hook. The funnel shape can actually increase resistance of the hook to move freely through the water. Further, it encumbers the line in such a way that a fisherperson may not desire.

Finally, U.S. Pat. No. 5,806,235 attempts to solve the fishhook threading problem by introducing a device which stores, ties, and dispenses fishhooks. This invention however, can only accommodate certain size fishhooks, namely, ones that can fit within its housing. Fishhooks that are larger than the housing cannot be used at all with this invention.

It is a purpose of this invention to provide a device to make the difficult task of threading a fishhook easy, and thus to save valuable time for the fisherperson. It is a further object of this invention to create a device that can easily be temporarily attached to a fishhook eye, for example, through the use of small lips that extend around the eye, a light adhesive, frictional engagement, or through the use of an extension that secures the threader to the barb. It is a further object of this invention to provide a means for the threader to be removed from the line once the line has been engaged with the fishhook to allow a fisherperson to have a line free of clutter and drag that interferes with the proper motion of the fishhook. It is a further object of this invention to create a device that allows for the easy threading of a fishhook that does not in any way inhibit the creation of a secure attachment between the line and hook.

BRIEF DESCRIPTION OF THE PRIOR ART

U.S. Pat. No. 1,322,815 shows a key labeling system wherein various name tags may be removed or added when the circumstances arise.

U.S. Pat. No. 1,601,018 illustrates a calendar with tags that can be removed.

U.S. Pat. No. 1,714,421 Illustrates an identification tag for key rings with a removable label contained therein.

U.S. Pat. No. 2,138,309 shows an identification system to allow a user to quickly discern like keys from like by utilizing a plate or disc that is attached to a key head.

U.S. Pat. No. 3,066,372 depicts a securing means for monofilament lines which is to be used especially on swivel rings.

U.S. Pat. No. 3,878,637 illustrates a fishhook that can be easily attached or removed from a monofilament line by means of a "C" channel.

U.S. Pat. No. 4,667,433 shows a fishhook safety device which can be mounted to the underside of a rod to allow snag-free transport of the rod.

U.S. Pat. No. 5,638,633 shows a fishhook threader which remains engaged with the hook eye once the line is attached.

U.S. Pat. No. 5,806,233 illustrates a lost-motion fishing lure which acts to more deeply hook a fish after it strikes.

U.S. Pat. No. 5,806,235 shows a fishhook dispenser and tying device which utilizes a spring mechanism to advance unused hooks into a line engageable position.

BRIEF SUMMARY OF THE INVENTION

Briefly, the invention comprises a one-piece fishhook threading mechanism that can be temporarily attached to a fishhook eye to allow a user to easily and quickly thread a fishhook and then remove the threader from the line completely by either crushing it or guiding the line through a radial slot located in the threader so that a user may have a fishing line free of the fishhook threading mechanism.

DESCRIPTIONS OF THE VARIOUS EMBODIMENTS

Figure 1:
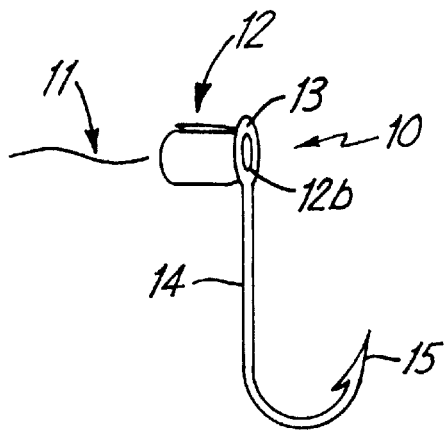
FIG. 1 shows a side view of the fishhook threader attached to a fishhook by means of a an adhesive.
Figure 2:
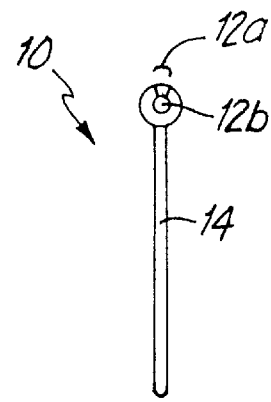
FIG. 2 shows a front view of a fishhook threader of FIG. 1.

Referring to FIG. 1 and FIG. 2 of the drawings, reference numeral 10 generally indicates a one-piece fishing line threader attached to a fishhook. The line threader 12 is attached to the fishhook eye piece 13 by an adhesive, which is sufficiently strong to hold the threader on the eyepiece during normal handling but sufficiently weak so as to be removable with finger pressure. A fishing line 11 is in position to be channeled through my line threader 12 and through the fishhook eye piece 13. The fishhook is comprised of the eye piece 13, a shank 14, and a barb 15. Once the fishing line 11 has been channeled through line threader 12 and through fishhook eye 13, the line threader 12 can be disengaged from eye piece 13 so that the fishing line 11 can be tied in a knot and fastened securely onto the fishhook without the threader 12 located thereon.

FIG. 1 shows my invention attached to a fishhook with a line 11 being inserted therein. The threader 12 is attached to the fishhook in such a manner so that the aperture 12b within the threader 12 is in alignment with the opening in the fishhook eye in the fishhook eye piece 13. A fishing line 11 would be inserted into the opening of the threader 12 and guided by the conical shaped inner walls of the threader 12 into the aperture 12b and from there through the fishhook eye piece 13. A user may hold the shank 14 of the fishhook with one hand to facilitate easier threading. After the line 11 has been successfully inserted through the fishhook eye piece 13, a user may remove the threader 12 by grasping it with the user fingers and sliding it away from the fishhook eye piece and then disengaging the threader from the line by guiding the line through the threader slot 12a that extends radially outward from the central aperture 12b.

Figure 3:
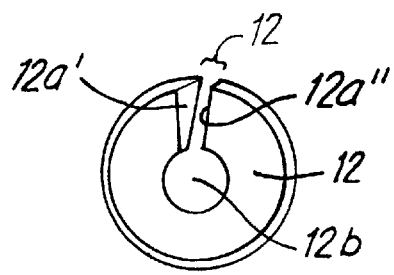
FIG. 3 shows a perspective view of the embodiment of the fishhook threader of FIG. 2.

FIG. 3 shows my line threader 12 in more detail. The threader slot 12a is defined by a first threader slot edge 12a' and a second threader slot edge 12a". When the threader is attached to a fishhook, a line can be guided through the aperture 12b. The inner walls of the threader 12 are tapered and conical shaped so as to be wide at the entrance point (the point furthest away from the hook) and narrow at the aperture point (the point closest to the fishhook eye piece). The diameter of the line insertion area of the threader 12 is sufficiently larger than the eye piece on a fishhook so as to easily allow a fisherperson to insert a line therein. Once inserted, the line 11 is guided along the inner, tapered and converging walls of the threader 12 to the aperture 12b. Once the line has been engaged or tied to the fishhook, the threader 12 can easily be removed by guiding the line 11 sideways through the slot 12a as defined by the first threader slot edge 12a' and the second threader slot edge 12a".

Figure 4:
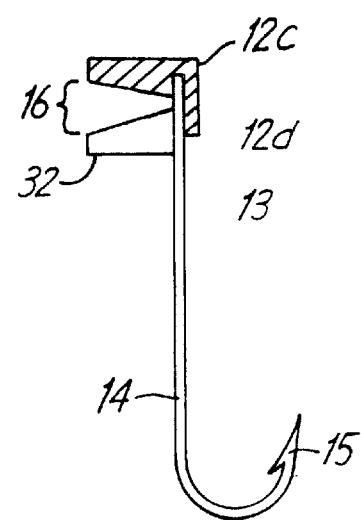
FIG. 4 shows a side perspective view of an alternate embodiment of the fishhook threader of FIG. 2.
Figure 4A:
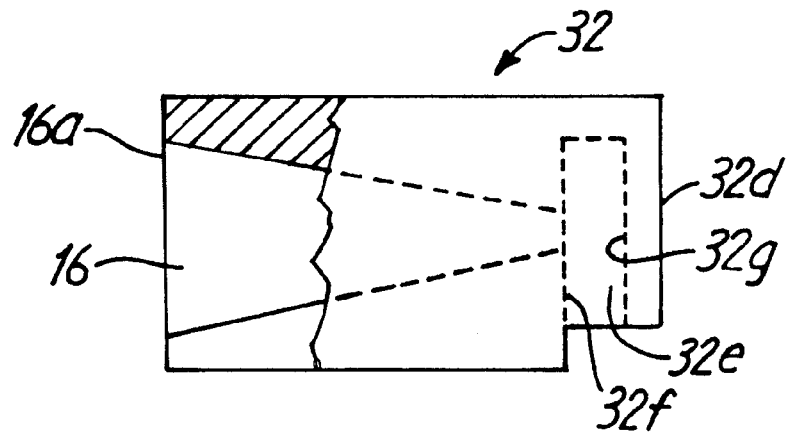
FIG. 4A shows a side view of the fishhook threader of FIG. 4
Figure 4B:
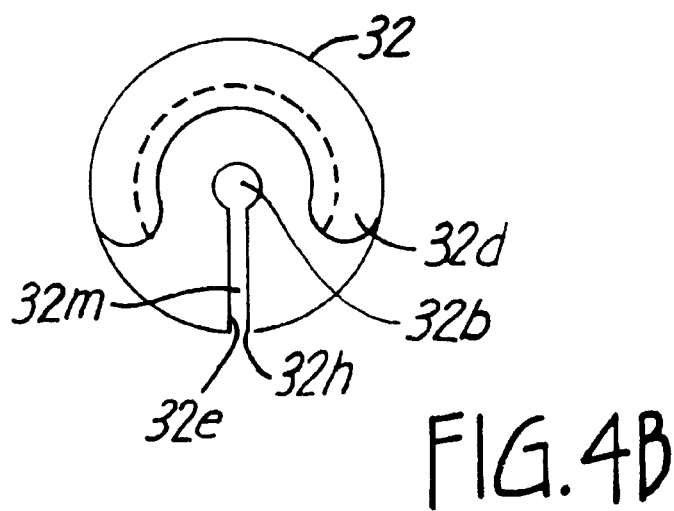
FIG. 4B shows an end view of the fishhook threader of FIG. 4.

FIG. 4 shows a side sectional view of another embodiment of my invention with the threader engagement mechanism 32 in section with FIG. 4A showing a side view and FIG. 4B showing and end view thereof. The threader 32 is attached to the fishhook through the mechanism of an annular loop lip 32d that is integrally formed in threader 32. The lip 32d extends over the outside of the eye piece 13 of the fishhook. A fishhook eye recess 32e, which is shown in dotted lines, extends into fish threader 32 to form a compartment for holding a fishhook eye therein through a pressure and friction engagement between a fishhook eyepiece member and the inner surfaces 32f and 32g of threader 32. Fishhook threader mechanism 32 includes a first end with a target area 16a which is larger than the central aperture 32b on the opposite end with the surface between the target area 16a and the eye 32b forming a conical converging surface for guiding a limp fishing line thereralong. Fishhook threader 32 includes radial surfaces 32h and 32i which extend radially inward to aperture 32b by forming a slot 32m.

Figure 5:
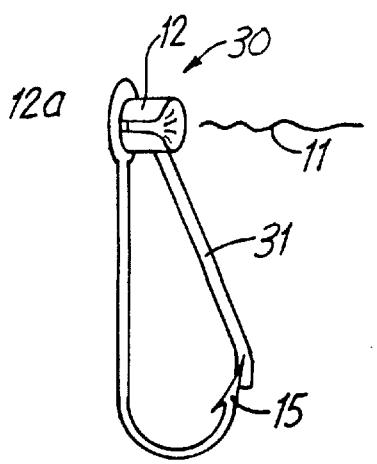
FIG. 5 shows a side partial sectional view of a further alternate embodiment of the fishhook threader as attached by the barb extension.

FIG. 5 shows a further embodiment of my threading mechanism wherein the threader 12 is securably fastened to the fishhook eye piece by means of an extension piece 31. The extension piece 31 engages the fishhook barb 15 in such a manner as to brace the threader against the fishhook eye piece to allow a user to easily thread a fishhook eye with a line. The threader can be removed from the fishhook by simply lifting the extension piece 31 away from the barb 15 and sliding the line 11 through the slot 12a to again create a line and hook mechanism free of threaders and other drag increase resistance devices. If desired the extension 31 can be used as handle for supporting the line threader.

Figure 6:
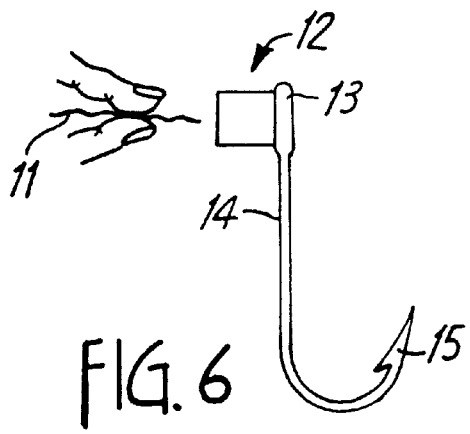
FIG. 6 shows a side view of the fishhook threader of FIG. 1 as a line is about to be guided through the threader.
Figure 7:
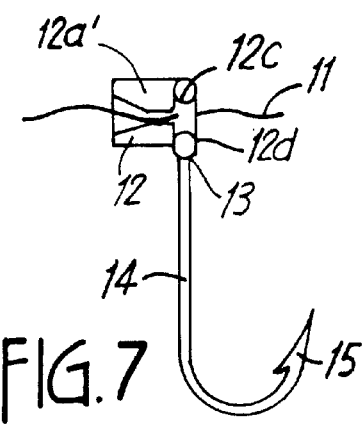
FIG. 7 shows a side sectional view of the fishhook threader of FIG. 1 with a fishing line drawn therethrough.
Figure 8:
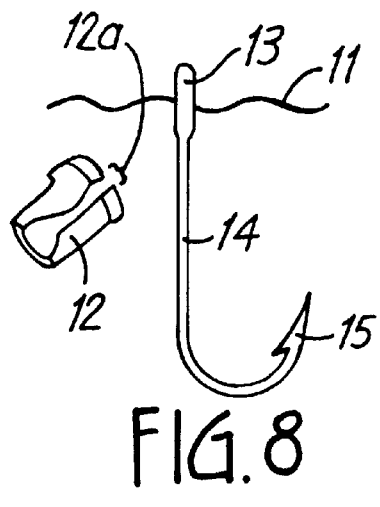
FIG. 8 shows the threader of FIG. 1 as having been removed from the fishhook.

FIG. 6–8 show the threading of a line and removal of the threader. In operation, the threader 12 is attached to a fishhook eye 13 to guide a fish line therethrough. Next, a line is inserted into the wide or target end of the threader 12. The line 11 is guided by the conical shaped inner walls of threader 12 through the central aperture 12b. When the line has traveled through the aperture and subsequently the fishhook eye, the threader is pulled away (FIG. 8) by simple hand force. The line 11 slides easily through the slot 12a to free the line from the threader 12, and allow a fisherperson to create a line and hook mechanism free of threader 12.

Figure 9:
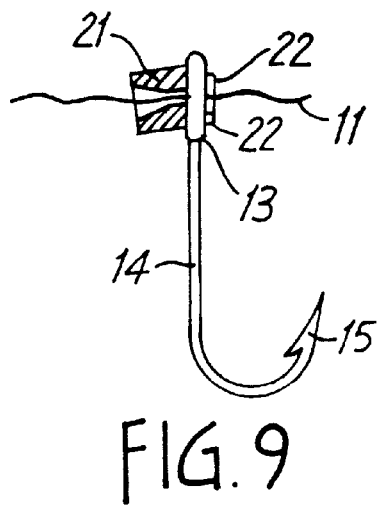
FIG. 9 shows a side sectional view of an alternate embodiment of the fishhook threader as constructed from a crushable material.
Figure 10:
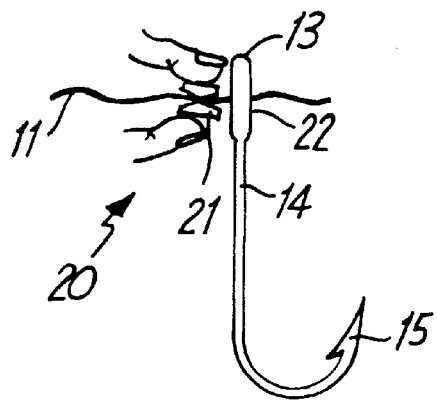
FIG. 10 shows a side view of the threader of FIG. 9 being crushed by a user who has already engaged the line through the fishhook eye.
Figure 11:
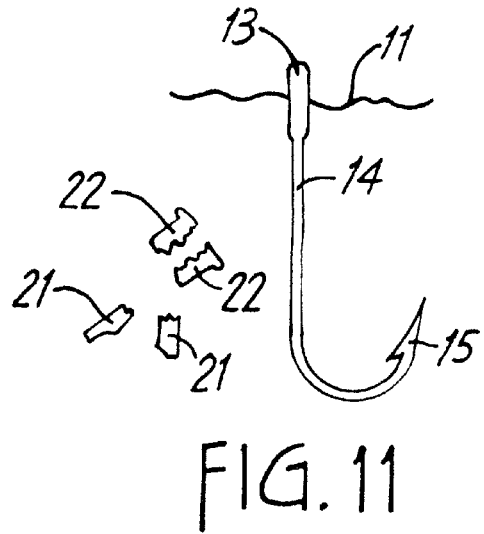
FIG. 11 shows a side view of the threader of FIG. 9 as the threader falls completely away from the fishhook and line.

FIGS. 9–11 show a further embodiment of my invention wherein the threader 21 is shown in cross section in FIG. 9 and comprises an annular member with no slot therein. The threader is constructed from a finger-crushable material such as Styrofoam plastic or the like. The threader 21 engages the fishhook eye piece 13 by means of an adhesive. A line 11 is inserted into the wide end of the threader 21 and is guided along the conical shaped walls through the fishhook eye. Once the line has been threaded, a user simply crushes the threader 21, thus causing both the threader and the annular lip 22 to fall away from the fishhook eye 13. With this embodiment the user does not need to remove the threader from the line by sliding the line through the slot. Instead the crushing of the line threader removes the threader from the line. The result is a line and hook mechanism free of threaders and other drag increasing resistance devices. It should be noted that the embodiment of the invention shown in FIGS. 9–11 is constructed for a single application only as the threader is destroyed during the removal thereof.

In order to make the fish line threader suitable for low light conditions a luminous paint or material can be applied to the convergent surfaces of the fish line threader to provide a luminous convergent surface to assist the person in directing the end of the line through the aperture.

While the diameter of the converging surfaces can vary with the applications a threader converging surface that has a radial diameter that is at least ten times the diameter of the aperture located therein is suitable for many applications. Preferably the line threader aperture has a diameter equal to or smaller than the fishhook to be threaded with said line threader to enable the line to pass through the eye without engaging the eyepiece member.

Thus with the present invention one can thread a fishhook by attaching a fishhook threading mechanism having a convergent member to the eyepiece of a fishhook so as to provide a target area larger than the eye of a fishhook. Next one directs a fishing line through the convergent member and the eye of the fishhook and then removes the fishhook threading mechanism from the fishhook. After removing the fishhook threading mechanism from the fishing line to provide a line and hook free of a fish threading mechanism.

I claim:

1. A fishhook having an eye located on one end of said fishhook, a removable line threader located in a ready-to-use condition external to the eye of said fishhook, said line threader having a first end with an opening therein and a second end, a convergent surface located in said line threader for directing a fishing line therealong, an aperture located in said second end of said threader with said convergent surface converging toward said aperture to thereby guide a fishing line through said aperture on said second end of said line threader, a fish hook attachment surface on said second end of said line threader, said fishhook attachment surface located on said second end of said line threader, said fishhook attachment surface located entirely external to the eye of the fishhook and being externally secured to a side of the eye of the fishhook to thereby hold said line threader in an extended cantilevered position proximate the eye of the fishhook to enable a person to thread a line through the line threader and the eye of the fishhook, said line threader removable from said fishhook by breaking the attachment between said fishhook attachment surface and said eye of the fishhook to enable use of the fishhook in a condition free of the line threader.

2. The line threader of claim 1 wherein said line threader has a luminous surface for guiding a fishing line therethrough.

3. The line threader of claim 1 wherein said line threader has a radial extending slot to permit removal of said line threader alter use of said line threader.

4. The line threader of claim 1 wherein said line threader includes a lip for removably engaging the eyelet of a fishhook to permit the temporary attachment of the line threader to the fishhook.

5. The line threader of claim 1 wherein said line threader is adhesively secured to a fishhook by an adhesive which is sufficiently strong to hold the threader on the fishhook during normal handling but sufficiently weak so as to be removable with finger pressure.

6. The line threader of claim 1 wherein said line threader is frictionally secured to a fishhook.

7. The line threader of claim 1 wherein said line threader converging surface has a radial diameter that is at least ten times the diameter of the aperture located therein.

8. The line threader of claim 1 wherein said line threader aperture has a diameter equal to or smaller than the fishhook to be threaded with said line threader.

9. The line threader of claim 1 wherein said line threader includes a handle for supporting the line threader.

10. The line threader of claim 1 wherein said line threader convergent surface includes a conical surface.

11. The line threader of claim 1 including a fishhook with an eyepiece wherein said line threader has an opening that is smaller than the opening in said eyepiece so that a fishing line threaded thereto is not obstructed by said eyepiece.

12. The line threader of claim 1 wherein said line threader comprises one-piece.

13. A line threader secured to a fishhook, said line threader having a first end with an opening therein and a second end, a convergent surface located in said line threader for directing a fishing line therealong, an aperture located in said second end of said threader with said convergent surface converging toward said aperture to thereby guide a fishing line through said aperture on said second end of said line threader, a fish hook attachment surface on said line threader for removably securing said line threader in a position proximate an eye of the fishhook, said line threader finger crushable to permit destructive removal of the line threader by crushing the line threader into multiple pieces between a user's fingers.

14. A line threader for temporary attachment to a fishhook, said line threader having a first end with an opening therein and a second end, a convergent surface located in said line threader for directing a fishing line therealong, an aperture located in said second end of said threader with said convergent surface converging toward said aperture to thereby guide a fishing line through said aperture on said second end of said line threader, a fish hook attachment surface on said line threader for temporarily securing said line threader in a position proximate an eye of the fishhook, said line threader including an extension for securing the line threader to a fishhook barb.

* * * * *